United States Patent
Kim et al.

(10) Patent No.: US 10,153,868 B2
(45) Date of Patent: Dec. 11, 2018

(54) HYBRID AUTOMATIC REPEAT REQUEST (H-ARQ) FOR A WIRELESS LOCAL AREA NETWORK

(71) Applicant: Apple Inc., Cupertino, CA (US)

(72) Inventors: Joonsuk Kim, Saratoga, CA (US); Yuchul Kim, San Jose, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 15/178,373

(22) Filed: Jun. 9, 2016

(65) Prior Publication Data

US 2016/0365952 A1 Dec. 15, 2016

Related U.S. Application Data

(60) Provisional application No. 62/175,164, filed on Jun. 12, 2015.

(51) Int. Cl.
*H04L 1/18* (2006.01)
*H04L 1/00* (2006.01)
*H04L 12/741* (2013.01)
*H04W 84/12* (2009.01)

(52) U.S. Cl.
CPC .......... *H04L 1/1816* (2013.01); *H04L 1/0083* (2013.01); *H04L 1/1819* (2013.01); *H04L 1/1845* (2013.01); *H04L 45/74* (2013.01); *H04L 1/0061* (2013.01); *H04W 84/12* (2013.01)

(58) Field of Classification Search
CPC ....... H04L 1/00; H04L 12/741; H04L 1/0083; H04L 1/1816; H04L 45/74; H04L 1/1819; H04L 1/1845; H04L 1/0061; H04W 84/12
See application file for complete search history.

(56) References Cited

U.S. PATENT DOCUMENTS

| | | | | |
|---|---|---|---|---|
| 2007/0127424 A1* | 6/2007 | Kwon | | H04L 1/1614 370/338 |
| 2010/0246543 A1* | 9/2010 | Rajkotia | | H04L 1/0075 370/338 |
| 2015/0071276 A1* | 3/2015 | Kim | | H04L 1/1845 370/338 |
| 2017/0230149 A1* | 8/2017 | Wang | | H04L 1/1819 |
| 2017/0353887 A1* | 12/2017 | Kim | | H04W 28/04 |

* cited by examiner

*Primary Examiner* — Charles C Jiang
*Assistant Examiner* — Kyaw Z Soe
(74) *Attorney, Agent, or Firm* — Dickinson Wright RLLP

(57) ABSTRACT

Apparatus and methods for a hybrid automatic repeat request (H-ARQ) mechanism for wireless communication devices of a wireless local area network (WLAN) are disclosed. Methods and apparatus to determine whether a packet is an original, first transmission or a retransmission of a previously transmitted packet without decoding the payload of the packet are disclosed. Medium access control (MAC) addresses of a transmitter, such as an access point (AP), and a receiver, such as a station (STA), of a WLAN are encoded separately with a retransmission bit to indicate whether the packet is retransmitted. For an aggregated MAC protocol data unit (A-MPDU), a sequence number is included to determine which MAC protocol data units (MPDUs) of the A-MPDU are retransmitted. When retransmission is indicated, the receiver of the STA performs a hybrid automatic repeat request (H-ARQ) process to combine the retransmitted packet with previously received packets.

20 Claims, 13 Drawing Sheets

HYBRID AUTOMATIC REPEAT REQUEST (H-ARQ) FOR A WIRELESS LOCAL AREA NETWORK

CROSS-REFERENCE TO RELATED APPLICATIONS

This Application claims the benefit of U.S. Provisional Application No. 62/175,164, entitled "HYBRID AUTOMATIC REPEAT REQUEST (H-ARQ) FOR A WIRELESS LOCAL AREA NETWORK", filed Jun. 12, 2015, the content of which is incorporated by reference herein in its entirety for all purposes.

FIELD

The described embodiments relate generally to wireless communications including methods and apparatus for a hybrid automatic repeat request (H-ARQ) mechanism for devices on a wireless local area network (WLAN).

BACKGROUND

A station (STA) on a WLAN shares an operating channel used by an access point (AP) for the WLAN with other stations. In present WLANs, packets are not identified as retransmitted packets, including aggregated packets that may include a mixture of original, first sent packets and retransmitted packets aggregated together. A station must decode a payload of a packet in order to determine whether the packet is addressed to the particular station rather than to another station that shares the same WLAN. A presently proposed 802.11ax Wi-Fi packet structure includes a field for the packet that identifies the recipient station address to which the packet is intended, but does not indicate a transmitting station address from which the packet originates. Instead, transmit and receive addresses and a retransmission bit are included in a medium access control (MAC) header, which cannot be confirmed until the MAC header and the payload are decoded and the frame check sequence (FCS) that accompanies the MAC header and payload combination is checked. When the FCS passes, the payload can be accepted, and retransmission is not required. When the FCS fails, the MAC header and/or the payload may be in error, and present implementations drop the payload entirely.

H-ARQ is used in cellular wireless communication systems that include dedicated control signaling channels separate from data channels, unlike in WLAN systems, in which a shared communication channel is used to communicate data packets and accompanying control information between the AP and multiple STAs.

SUMMARY

Methods and apparatus that permit a determination of whether a packet is an original, first transmission or a retransmission of a previously transmitted packet without having to decode the entire payload of the packet are disclosed. Medium access control (MAC) addresses of a transmitter, such as an access point (AP), and a receiver, such as a station (STA), of a WLAN are encoded separately with a retransmission bit included per MAC protocol data unit (PDU) to indicate whether the MAC PDU (MPDU) is retransmitted. For aggregated packets, such as for an aggregated MAC protocol data unit (A-MPDU), a sequence number is also indicated to provide for assisting in determining which MAC protocol data units (MPDUs) of the A-MPDU are retransmitted. When retransmission signaling is indicated in a packet, the receiver of the STA performs a hybrid automatic repeat request (H-ARQ) process to combine the retransmitted packet with previously received packets. In some embodiments, MAC addresses are provided to a physical (PHY) layer processing element in the AP and/or the STA to enable the H-ARQ process.

In some embodiments, a WLAN packet that includes a single MPDU includes a H-ARQ header field that contains physical layer information for retransmission, including a transmitter MAC address, a receiver MAC address, a retransmission bit, and a byte length for the associated MDPU. In some embodiments, a WLAN packet that includes multiple MPDUs includes a H-ARQ header field that also contains sequence number information to indicate which MPDUs of the multiple MPDUs are retransmitted. A receiver of the STA combines the retransmitted MPDU with previously transmitted MPDUs (including previous retransmissions if applicable) using a log-likelihood-ratio (LLR) combining technique, after checking the H-ARQ header to determine whether the MPDUs are retransmitted. For an A-MPDU packet, an indication of the length of each MPDU included in the A-MPDU packet is included in the H-ARQ header. In some embodiments, delimiters between MPDUs are eliminated, as the length information indicates the size of each MPDU. In some embodiments, the receiver identifies a retransmitted packet to use for LLR combining by locating a packet having a transmitter MAC address, a receiver MAC address, and a sequence number that is identical to a previously received packet and having a retransmission bit set. In some embodiments, a MAC header is not included in each MPDU of a single MPDU packet or the multiple MPDUs of an A-MPDU to reduce control signaling overhead.

In some embodiments, when a receiver of a STA identifies that a header frame check sequence (FCSh) passes but a data frame check sequence (FCSd) fails for an MPDU of a WLAN packet, the receiver stores any soft decoding information, e.g., LLR information, when the receiver MAC address matches the MAC address of the STA. The receiver of the STA associates with the stored soft decoding information the transmitter MAC address. When receiving a retransmitted packet addressed to the STA (based on the receiver MAC address) and having the same transmitter MAC address and a retransmission bit set, the receiver of the STA combines the stored soft decoding information with new soft decoding information to decode the received packet. Multiple retransmissions can be recombined to improve the decoding performance.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION

Figure 1:
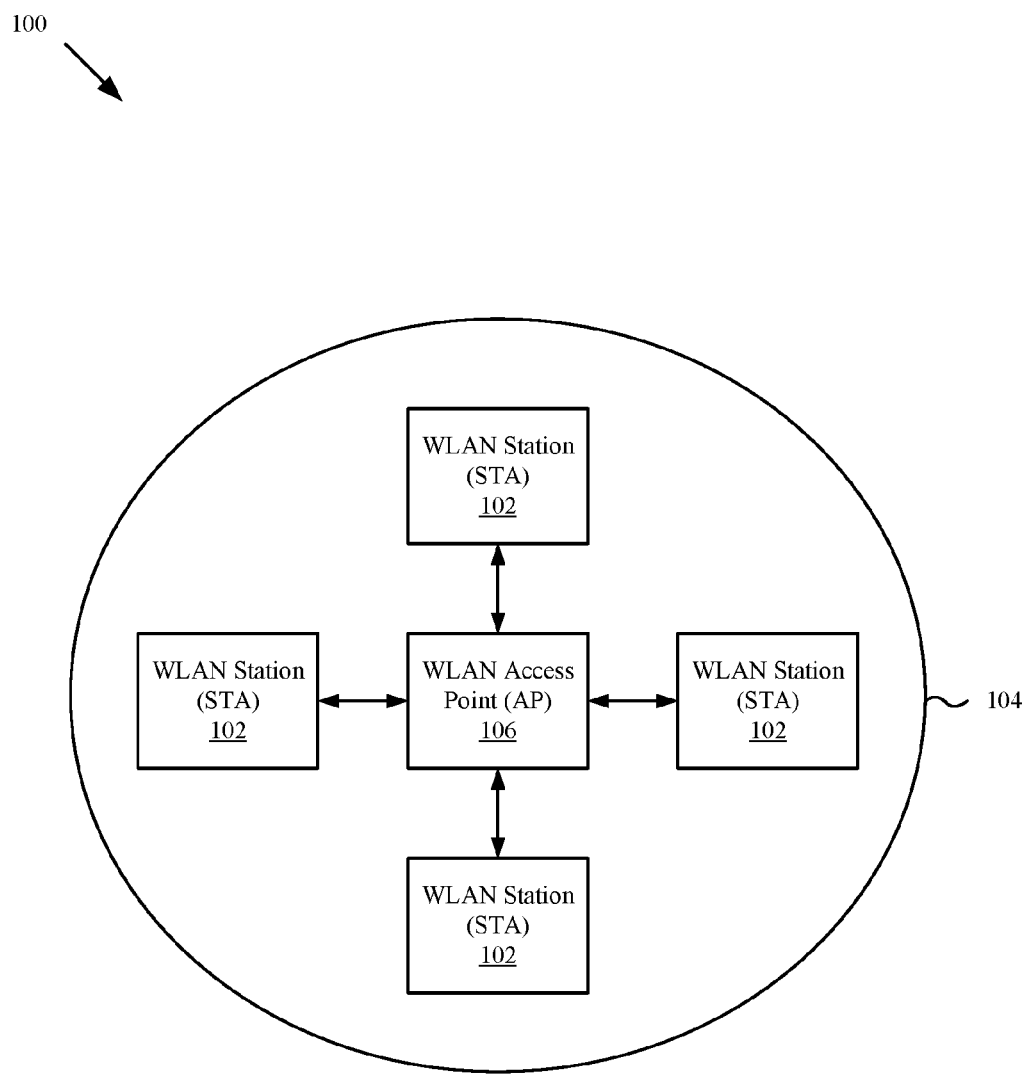
FIG. 1 illustrates an example system, in accordance with some embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE) network, an LTE Advanced (LTE-A) wireless network, and/or a 5G or other present or future developed advanced cellular wireless network.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

Some example embodiments address deficiencies in previous methodologies for handling retransmission of packets by devices of WLANs. In this regard, some example embodiments provide for formatting, encoding, sending, receiving, and decoding WLAN packets using a structure that includes retransmission information to support a hybrid automatic repeat mechanism (H-ARQ) for devices of a WLAN. The H-ARQ mechanism uses soft decoding information from previously transmitted medium access control (MAC) protocol data units (PDUs) to combine with a received retransmitted MAC PDU (MPDU) to improve decoding of the MPDU. The WLAN packets include a H-ARQ header that includes MAC addresses of a transmitter, e.g., an access point (AP), and a receiver, e.g., a station (STA), with a retransmission bit to indicate the MPDU is retransmitted. The STA identifies the WLAN packet as intended for the STA based on the receiver MAC address, determines the WLAN packet includes an MPDU based on the retransmission bit, and associates the retransmitted MPDU with a previously transmitted MPDU from the AP based on the transmitter MAC address and a sequence number when applicable, e.g., when there are multiple MPDUs in an A-MPDU. When a frame check sequence for a header (FCSh) of an MPDU decodes correctly and a frame check sequence for data (FCSd) of the MPDU decodes incorrectly, by which the receiver of the STA detects that an error in the data portion of the MPDU, the receiver of the STA stores soft decoding information for the MPDU. When the incorrectly decoded MPDU is a retransmitted MPDU, the receiver of the STA combines the soft decoding information with previously stored soft decoding information from previously received MPDUs. The STA combines soft decoding information from the MPDU with soft decoding information stored from previously received (and incorrectly decoded) MPDUs to improve decoding of the MPDU. For WLAN packets that aggregate multiple MPDUs, e.g., an A-MPDU WLAN packet, a sequence number is also included with which the receiver of the STA identifies which MPDUs are retransmitted. In some embodiments, delimiters between multiple MPDUs of an A-MPDU are eliminated by including byte length information in the H-ARQ header. In some embodiments, MAC headers are shortened or eliminated when using the H-ARQ header to reduce control signaling overhead in the WLAN packet. In some embodiments, the H-ARQ mechanism is performed at a bit-level after demodulation of the MPDU and includes combining decoded bits from two different MPDUs that each use a different forward error correction coding rate. In some embodiments, the H-ARQ mechanism disclosed herein permits combining soft decoding information from two different packets that each use a different modulation and coding scheme (MCS).

In some embodiments, an A-MPDU includes multiple MPDUs, with each MPDU assigned a sequence number, and up to 64 MPDUs in total aggregated in the A-MPDU. In some embodiments, the H-ARQ header includes an initial sequence number for one MPDU and an eight byte (64 bit) bitmap, one bit per MPDU, to indicate offsets of sequence numbers for the other MPDUs. By combining the initial sequence number and the bitmap, the sequence numbers of the other MPDUs can be communicated efficiently and determined by the receiver of the STA without requiring transmission of each sequence number of each MPDU in the A-MPDU. In some embodiments, the H-ARQ header includes MAC header information from the MPDU (or from multiple MPDUs for an A-MPDU packet). In some embodiments, MAC header information is included with the payload of the MPDU, as in legacy protocols. In some embodiments, MAC header information is shortened or eliminated from the MPDU to reduce overhead, and processing in the receiver of the STA at the physical layer reassembles MAC header information based on information in the H-ARQ header and provides the MAC header plus payload (MPDU) to the MAC layer. In some embodiments, the transmitter, e.g., the AP, upon retransmission changes the MCS, e.g., to use a less dense constellation and/or to use a different coding rate. As the H-ARQ process disclosed herein is performed at the physical layer, in some embodiments, the bits of each retransmission, including when different MCS are used for the retransmission of the packet from an earlier transmission of the packet, can be combined to improve decoding. In addition, as the H-ARQ process occurs at the physical layer, soft decoding information from decoding previous MPDUs can be combined with a retransmitted MPDU to improve decoding, unlike a H-ARQ process at the MAC layer, which would lose the soft decoding information and only have hard decisions of the bits of the MPDU for decoding. Thus, the H-ARQ process disclosed herein provides for an improved performance over performing a H-ARQ process at the MAC layer. As described herein, MAC addresses are provided with retransmission bits in the H-ARQ header to the physical layer to permit determining at the physical layer a retransmitted MPDU addressed from the AP and addressed to the STA. In some embodiments, the H-ARQ process at the physical layer provides approximately a 3 to 4 dB performance gain of throughput relative to retransmission without the H-ARQ process.

In some embodiments, when a frame check sequence (FCS) for the H-ARQ header fails during decoding, the subsequent MPDUs of the packet are discarded, as the MAC transmit address and receive address in the H-ARQ header may be invalid and the MPDUs may be intended for another STA. In some embodiments, to improve reliability for decoding the H-ARQ header, the H-ARQ header uses an MCS that provides maximum coding gain and/or reliability, e.g., a lower or lowest valid MCS value (such as MCS=0, or an MCS value that is one, two, or "k" lower than the MCS values used for the MPDUs, where "k" is a positive integer.)

While the H-ARQ process is described in terms of an AP retransmitting to a STA, the same H-ARQ process can also be used by the AP for decoding packets received from the STA. Moreover, the AP can maintain soft decoding information for retransmission of packets from multiple STAs, for each STA individually and in parallel.

FIG. 1 illustrates an example system 100, in accordance with some embodiments. The system 100 can include one or more WLAN stations 102, each of which can also be referred to as a station (STA). A STA 102 can be any computing device that can communicate via a communication channel of a WLAN 104. By way of non-limiting example, a STA 102 can be a cellular phone or smart phone, a tablet computer, a laptop computer, a notebook computer, a personal computer, a netbook computer, a media player, an electronic book device, a MiFi® device, a wearable computing device, as well as any type of electronic computing device having wireless communication capability configurable to operate as part of the WLAN 104.

In the example system 100, a STA 102 can join the WLAN 104 by communicating with a WLAN access point (AP) 106 that manages the WLAN 104. The AP 106 can be any computing device that can be configured to serve as an access point for the WLAN 104. The WLAN 104 can use any networking protocol or standard that can be used for a WLAN. In some example embodiments, the WLAN 104 can be a network that operates in accordance with an Institute of Electrical and Electronics Engineers (IEEE) 802.11 wireless communication protocol, including but not limited to 802.11a, 802.11b, 802.11g, 802.11n, 802.11ac, 802.11ax, or other present or future developed IEEE 802.11 protocol.

The AP 106 can transmit WLAN packets to and received WLAN packets from a STA 102 over an operating channel of the WLAN 104. A STA 102 can also use the operating channel of the WLAN 104 to communicate with the AP 106.

The AP 106 can format WLAN packets in accordance with a structure as shown herein. The WLAN packet format can include one or more fields, e.g., a H-ARQ header field that includes retransmission information, with which a STA 102 can determine whether one or more MAC PDUs (MPDUs) of the WLAN packet are retransmitted by the AP 106. The STA 102 can combine multiple transmissions of an MPDU to improve decoding using a soft decoding technique, such as based on a log-likelihood-ratio (LLR) combining method. In some embodiments, MAC headers for each MPDU of the WLAN packet can be shortened or eliminated to reduce overhead in the WLAN packet. In some embodiments, the H-ARQ header includes information to indicate to a STA 102 which MPDUs of an aggregated MPDU (A-MPDU) WLAN packet are retransmitted.

Figure 2:
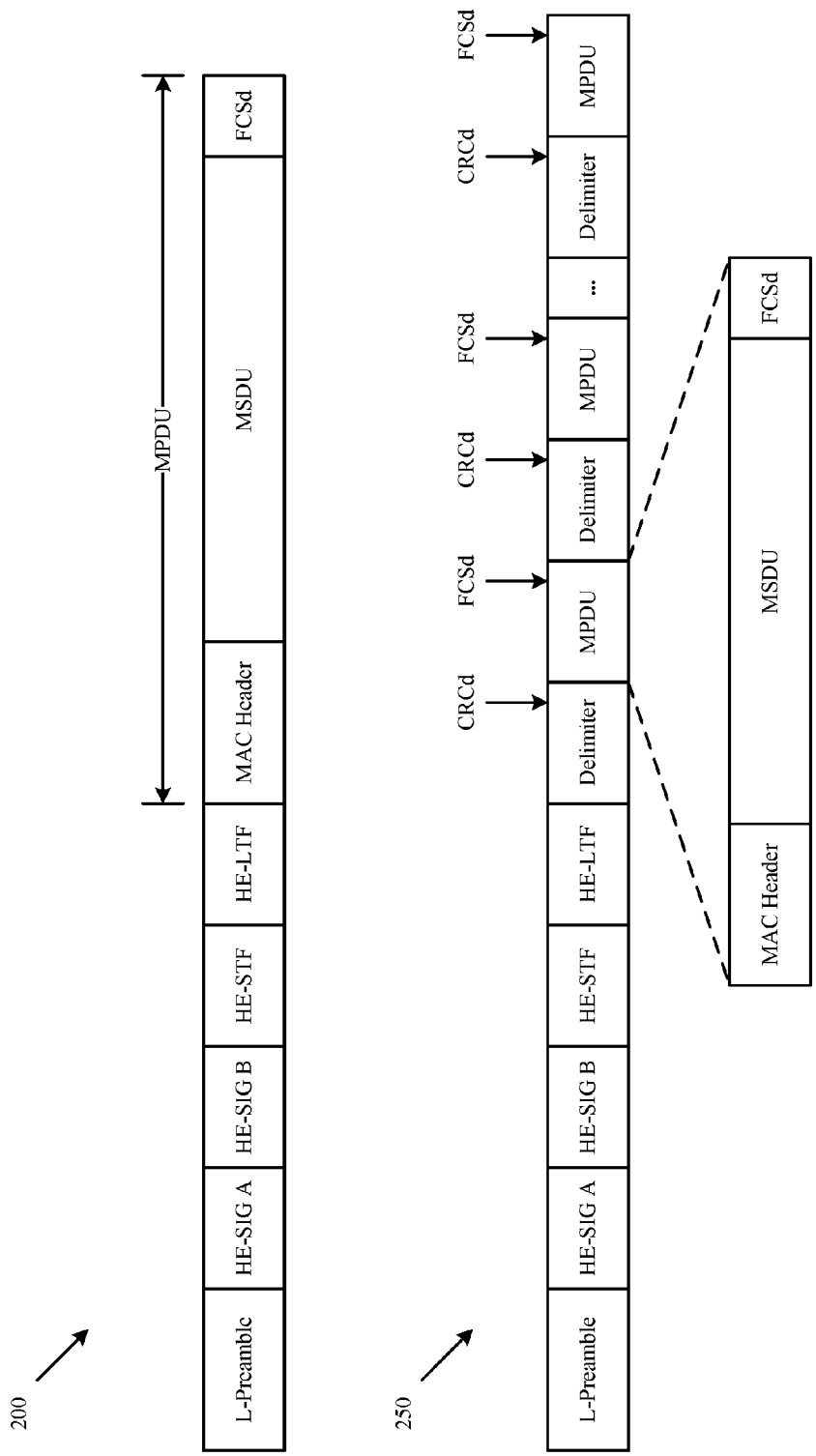
FIG. 2 illustrates exemplary packet formats without a retransmission header field for a WLAN protocol.

FIG. 2 illustrates exemplary packet formats that do not include a retransmission header field for a WLAN protocol. Currently under consideration for inclusion in a version of an IEEE 802.11 wireless communication protocol, e.g., for 802.11ax, is a format of a single, physical (PHY) layer packet 200 that includes a single MAC PDU (MPDU), including a MAC header and a MAC service data unit (MSDU), preceded by a set of header fields. Additionally, under consideration for 802.11ax is a second format for an aggregated multiple PHY layer packet 250 includes multiple MPDUs preceded individually by delimiter fields and overall by the set of header fields. Each MPDU includes a data Frame Check Sequence (FCSd) based on values of the MPDU's MAC header and the MPDU's data, i.e., the MSDU. The FCSd can be used to determine whether the MPDU, including both the MAC header and the MSDU, is received correctly by the wireless device. The header fields of the packets 200, 250 include a preamble (labeled L-Preamble) followed by a first control signaling field (labeled HE-SIG-A) that includes common control signals for the packets 200, 250. The HE-SIG-A field includes a partial association identifier (PAID) that includes a recipient address by which the wireless device can determine whether the packet 200, 250 is intended for the wireless device. The HE-SIG-A does not include an originating transmitter address and is insufficient to determine whether the single MPDU of the packet 200 is an original transmission or a retransmission. Furthermore, each MPDU of the aggregated multiple PHY layer packet 250 can be individually retransmitted, and thus a single bit indication of a retransmission for the entire aggregated multiple PHY layer packet 250 would not suffice to determine whether an individual MPDU of the packet 250 is retransmitted. The header fields of the packets 250 also include a second control signaling field (labeled HE-SIG B) that includes additional user specific information that is useful for multiple user (MU) communication and/or for orthogonal frequency division multiple access (OFDMA) communication but does not provide information useful for a H-ARQ process as described herein. The packets 200, 250 include one or more MPDUs, each of which include a MAC header, an MSDU, and an FCSd. The MAC header includes both transmit address (TA) and receive address (RA) information and a retransmission bit for the MPDU, by which the wireless device can determine whether the MPDU is retransmitted. The wireless device, however, must decode the MPDU to extract the MAC header as well as check the FCSd to determine whether the MAC header is received and decodes correctly before learning whether the MPDU is retransmitted. When the MPDU's FCSd passes, i.e., indicates that the MPDU, including both the MAC header and the MSDU decodes correctly, the wireless device can determine that the MPDU is correctly received, and therefore no re-transmission of the MPDU is required. When the MPDU's FCSd fails, i.e., indicates that part of the MPDU, which can include one or both of the MAC header and the MSDU, decodes incorrectly, the wireless device can determine that the MPDU includes an error. The wireless device, however, cannot determine if the MAC header is correct and thus cannot determine whether a retransmission has occurred, as the retransmission bit in the MAC header may have decoded incorrectly. Thus, the wireless device cannot use a retransmission bit included in a MAC header of the MPDU to determine whether the MPDU is an originally transmitted MPDU or a re-transmitted MPDU when the FCSd for the MPDU fails. Similarly, for the aggregated packet 250, each MPDU includes its own FCSd, which can indicate a failure of the corresponding MPDU. As with the single packet 200, the wireless device cannot determine whether individual MPDUs are initial transmissions or retransmissions when a failure of the corresponding FCSd occurs. The structure of the packets 200, 250 illustrated in FIG. 2, which include error checking of both the data (MSDU) of the MPDU and the MAC header of the MPDU combined into the single FCSd limits the ability of the wireless device to combine multiple retransmissions of an MPDU, and instead the MPDU either decodes correctly or is discarded.

As discussed herein, to provide for hybrid automatic repeat request (H-ARQ) soft-decision combining of packet retransmissions at a physical (PHY) layer, a data frame format can include a H-ARQ header that precedes one or more MPDUs and includes sufficient information to identify whether individual MPDUs of the data frame have been originally transmitted or retransmitted. In some embodiments, the H-ARQ header is used in addition to MAC headers for each MPDU, while in other embodiments, the H-ARQ header includes information so that MAC headers can be shortened or eliminated to reduce overhead. In some embodiments, the control signaling field separate from the H-ARQ header includes an indication whether the data frame is formatted to include the H-ARQ header, in which case a receiver of a wireless device that processes the data frame can perform a H-ARQ soft-decision combining process to improve decoding of one or more MPDUs of the data frame. In some embodiments, the H-ARQ header includes MAC layer address information, e.g., transmitter address (TA) and receiver address (RA) information to allow for determination of whether the MPDUs are indicated for the receiving wireless device and originate from a particular transmitter. Retransmissions of an MPDU are combined separately for different originating transmitters. The H-ARQ header can include retransmission information, e.g., a retransmission bit per MPDU, which indicates whether each MPDU is an original transmission or a retransmission. The H-ARQ header can also include sequence number information by which the receiving wireless device can determine to which sequence to apply soft-decision combining of retransmissions of each MPDU. In some embodiments, a TA, an RA, and a sequence number can uniquely identify an MPDU so that the receiving wireless device can combine a retransmitted MPDU with an earlier transmitted MPDU to improve decoding of the MPDU. In some embodiments, the H-ARQ header includes an indication of the number of bytes per MPDU, which can be used when decoding multiple MPDUs that have been aggregated in a single data frame.

Figure 3:
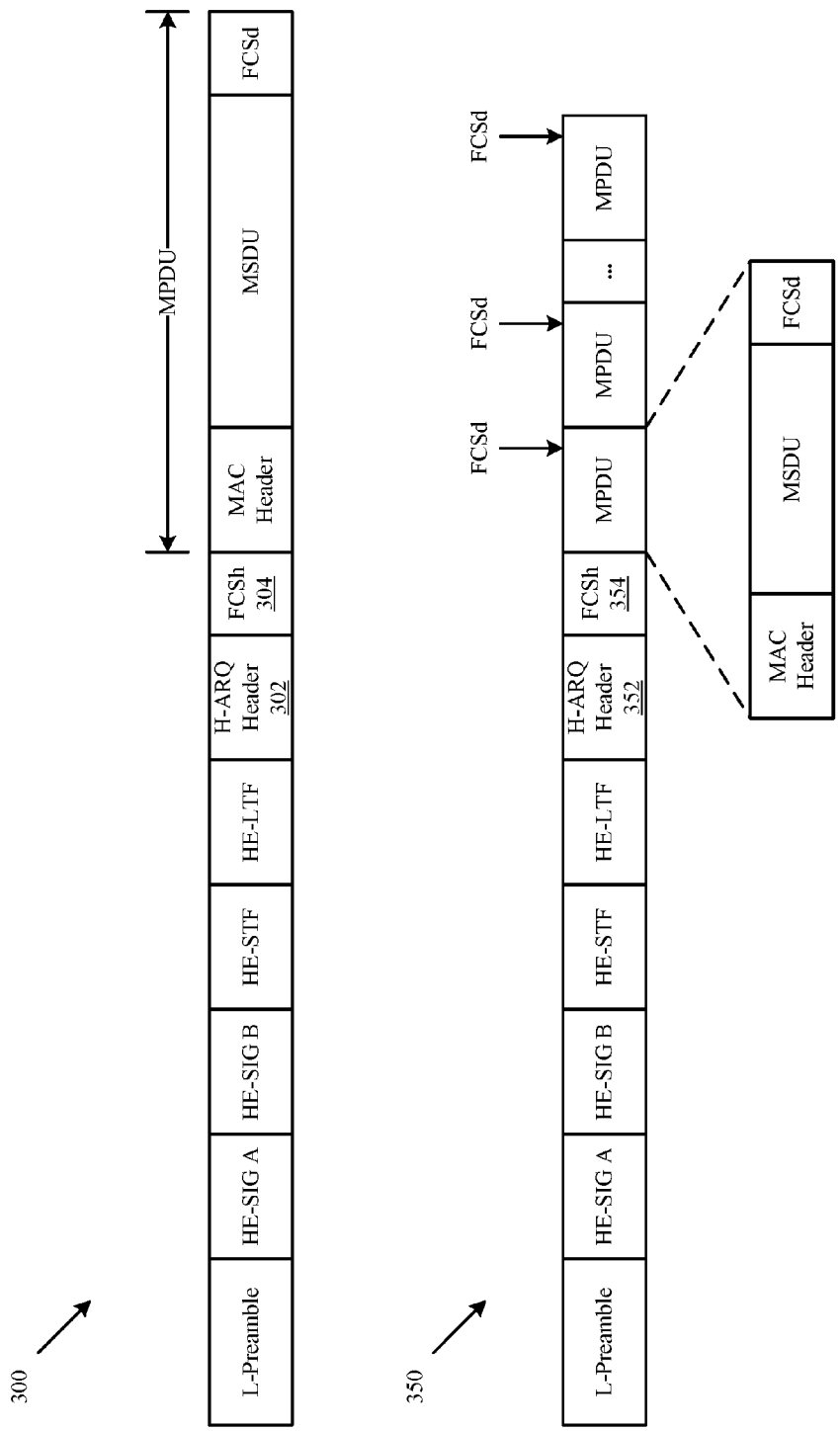
FIG. 3 illustrates exemplary packet formats that include a retransmission header field for a WLAN protocol, in accordance with some embodiments.

FIG. 3 illustrates exemplary packet formats that include a retransmission header field for a WLAN protocol. A data frame 300 includes a single MPDU and a retransmission header field, labeled as H-ARQ header 302, that can include retransmission information as described herein. A header frame check sequence (FCSh) 304 for the H-ARQ header 302 is appended to the H-ARQ header 302 so that a receiving wireless device can determine, using the FCSh 304, whether the H-ARQ header 302 has been received correctly. The H-ARQ header 302 can include the TA and RA for the MPDU and a retransmission bit to indicate wither the MPDU is an original transmission or a retransmission. The H-ARQ header 302 can also include a sequence number for the MPDU. When the FCSh 304 passes, i.e., indicates that the H-ARQ header 302 was received correctly, the receiving wireless device can use the TA, RA, and retransmission bit of the H-ARQ header 302 to uniquely identify the MPDU and with the sequence number determine an applicable sequence, when a retransmission occurs, with which to recombine retransmissions of the MPDU. The data frame 350 includes multiple MPDUs and a retransmission header field, labeled as H-ARQ header 352, that includes retransmission information as described herein. The FCSh 354 for the H-ARQ header 352 is appended to the H-ARQ header 352 so that the receiving wireless device can determine, using the FCSh 354, whether the H-ARQ header 352 has been received correctly. The H-ARQ header 352 can include the TA and RA information for each MPDU of the data frame 350 and a retransmission bit for each MPDU to indicate wither the corresponding MPDU is an original transmission or a retransmission. The H-ARQ header 302 can also include sequence number information for the multiple MPDUs of the data frame 350, by which the receiving wireless device can determine applicable sequences for each MPDU of the data frame 350. When the FCSh 354 passes, i.e., indicates that the H-ARQ header 352 was received correctly, the receiving wireless device can, for each MPDU, use the corresponding TA, RA, and retransmission bits of the H-ARQ header 352 to uniquely identify each MPDU and with a corresponding sequence number for the MPDU. When a retransmission occurs of an MPDU occurs, the receiving wireless device can recombine the retransmission of the MPDU with one or more earlier transmissions of the MPDU.

Figure 4:
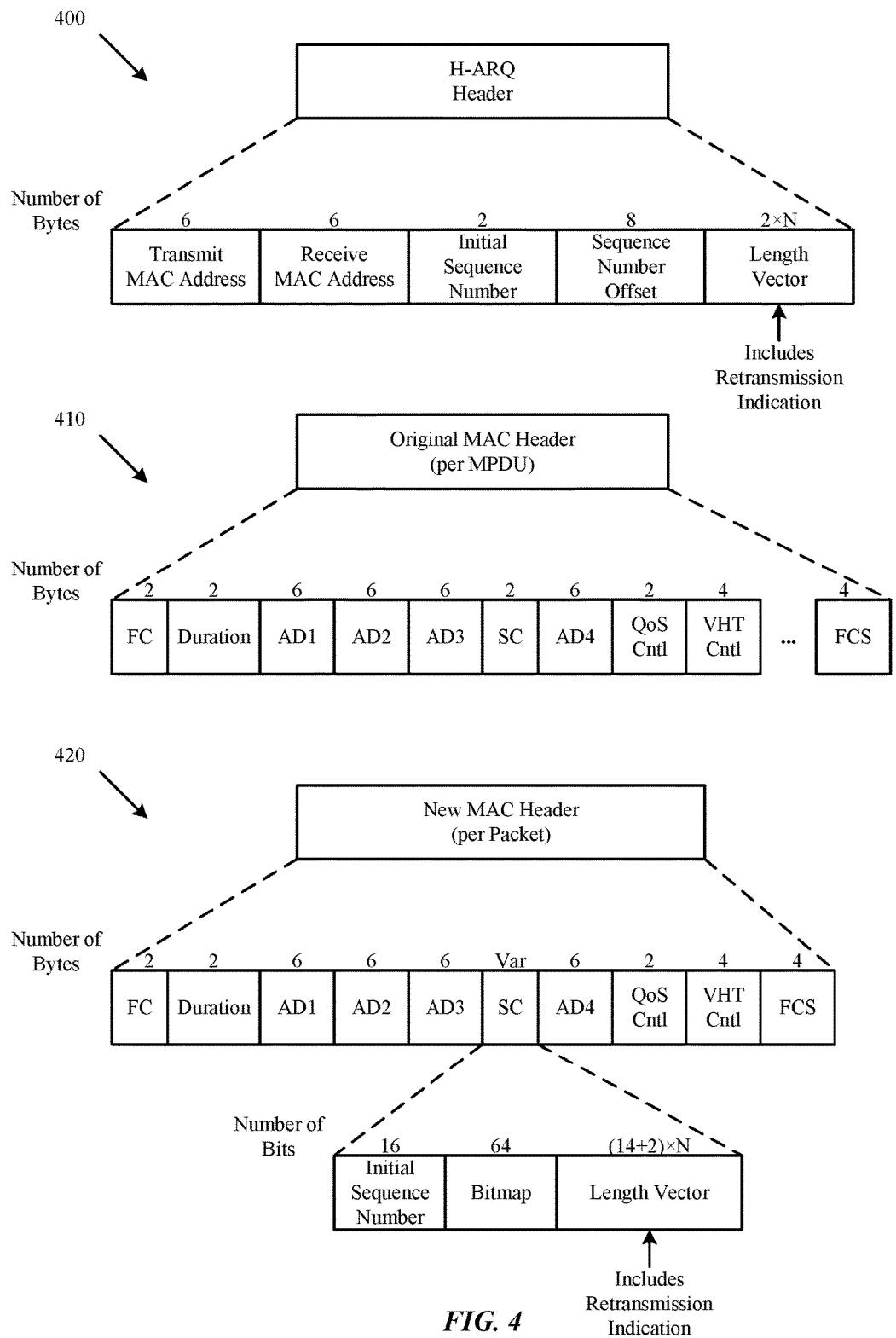
FIG. 4 illustrates exemplary formats for header fields of a packet, in accordance with some embodiments.

FIG. 4 illustrates exemplary formats for header fields of a packet. The diagram 400 illustrates a format for a H-ARQ header, e.g., the H-ARQ header 302, 352, which includes a transmit MAC address (TA) of six bytes, a receive MAC address (RA) of six bytes, an initial sequence number of two bytes, and a sequence number offset of 8 bytes (64 bits), which provides sequence number information for up to 64 MPDUs that can be aggregated in a single aggregated MPDU data frame, and a length vector, which includes a retransmission indication. To reduce the total amount of control information for an aggregated MPDU data frame, rather than transmit a sequence number of each MPDU of the aggregated MPDU data frame, a sequence number for the first MPDU and a set of sequence number offsets in a bitmap can be used to indicate the set of sequence numbers for all of the MPDUs of the aggregated MPDU data frame. The H-ARQ header illustrated in the diagram 400 includes information useful for performing soft-decision combining of multiple transmissions of MPDUs. For each MPDU, the TA and RA information and an indication of retransmission can be included in the H-ARQ header illustrated by the diagram 400. The length vector of the H-ARQ header can include two bits for each MPDU in the packet, one bit providing a retransmission indication and a second bit to indicate additional fragmentation. The variable "N" indicated for the length vector can equal the number of MPDUs in the packet. The diagram 410 illustrates a format for a MAC header that can be included with each MPDU. The diagram 420 illustrates a format for a single, consolidated MAC header that can be included for the set of MPDUs of an aggregated MPDU data frame. Retransmission information for the set of MPDUs of the aggregated MPDU data frame can be included in the length vector.

In some embodiments, all or part of MAC layer header information for each MPDU is included in a common PHY layer header for a single MPDU data frame or an aggregated MPDU data frame. In some embodiments, essential information for a H-ARQ soft-decision combining process is included in a H-ARQ header as a PHY layer header for a single MPDU data frame or an aggregated MPDU data frame. In some embodiments, MAC headers are removed or compressed at a transmitter using a H-ARQ process to reduce the total number of bits/bytes in the data frame. In some embodiments, MAC headers are included for each MPDU unchanged. In some embodiments, when MAC headers are compressed or not included in the aggregated MPDU, a PHY layer processing module of the receiving wireless device reconstructs MAC headers for each correctly decoded MPDU when providing the MPDU to a MAC layer processing module of the receiving wireless device.

Figure 5:
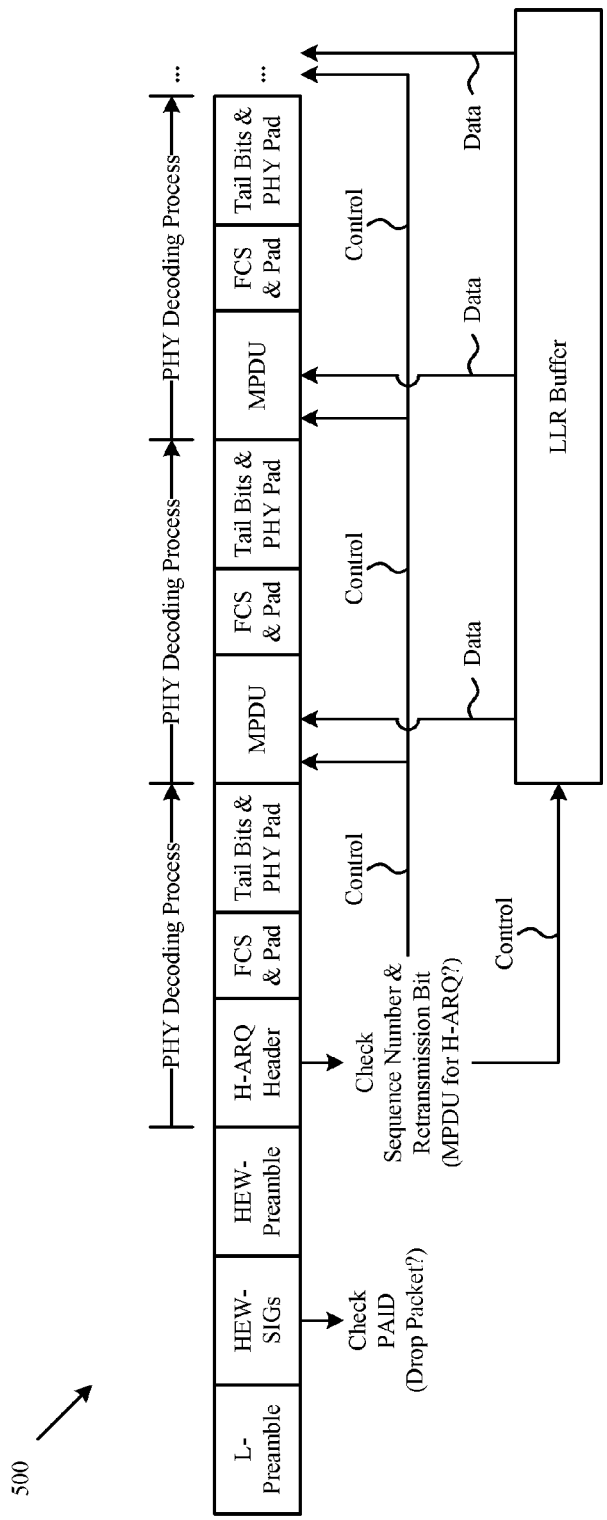
FIG. 5 illustrates a diagram of an exemplary data frame processing sequence for a receiver of a wireless device, in accordance with some embodiments.

FIG. 5 illustrates a diagram 500 of an exemplary data frame processing sequence for a receiver of a wireless device. The data frame, which can also be referred to as a packet, a wireless packet, a WLAN packet, or a Wi-Fi packet, begins with a legacy preamble (L-Preamble) followed by a set of signaling fields (HEW-SIGs), the latter which can include a partial association identifier (PAID) by which the receiving wireless device can determine whether to process or drop the data frame (packet). Following additional preamble fields (HEW-Preamble), the data frame includes a H-ARQ header, as described herein, followed by a frame check sequence for the H-ARQ header (FCSh) and additional PHY layer padding. The receiver of the wireless device checks whether the FCSh passes or fails to determine whether the H-ARQ header bits have been received correctly and are reliable. When the FCSh fails, the wireless device can discard the data frame. When the FCSh passes, the wireless device can continue to process the data frame. In some embodiments, the H-ARQ header and FCSh can be encoded with a modulation and coding scheme (MCS) that provides a higher level of protection from random errors than the MCS applied to the MPDU data. In some embodiments, the H-ARQ header and FCSh are encoded with an MCS value that corresponds to a lowest encoding rate, e.g., an MCS value of zero. In some embodiments, the H-ARQ header and FCSh are encoded with a non-negative MCS value that is less than a corresponding MCS value used for encoding the MPDU.

When the FCSh of the H-ARQ header passes, the wireless device can determine using information in the H-ARQ header, whether one or more MPDUs in the data frame are addressed to the wireless device, e.g., using a receive address (RA) in the H-ARQ header, which can be copied from MAC headers for the MPDUs at the transmitter. The wireless device can also determine from which transmitter the MPDUs originated, e.g., using a transmit address (TA) in the H-ARQ header. Furthermore, the wireless device can determine which of one or more MPDUs of the data frame are original transmissions and which are retransmissions, e.g., based on retransmission bits in the H-ARQ header. For each MPDU of the data frame, the wireless device can determine an applicable sequence number using information in the H-ARQ header, e.g., using the initial sequence number and sequence number offset of the H-ARQ header shown in the diagram 400 of FIG. 4. The wireless device can process the MPDUs of the data frame addressed to the wireless device and check a data frame check sequence (FCSd) for each MPDU addressed to the wireless device to determine whether the corresponding MPDU is received correctly. For correctly received, original transmissions of an MPDU addressed to the wireless device, a decoded hard-decision MPDU can be provided by a PHY layer process to a MAC layer process for further processing in the wireless device. For incorrectly received, original transmissions of an MPDU addressed to the wireless device, a soft-decision MPDU can be stored in a memory of the wireless device for further processing with subsequent retransmissions of the MPDU. For a retransmission of an MPDU addressed to the wireless device, a soft-decision MPDU for the retransmission can be combined with a previously stored soft-decision MPDU to form a soft-decision combined MPDU. The wireless device can recombine each soft-decision MPDU for retransmissions of a particular MPDU with previously stored, combined soft-decision MPDUs. Each combined soft-decision MPDU can be decoded into a decoded hard-decision MPDU, the latter which can be provided by the PHY layer process to the MAC layer process for further processing in the wireless device when a data frame check sequence (FCSd) for the decoded hard-decision MPDU passes.

Soft-decision MPDUs from retransmissions of an MPDU can be combined with previous soft-decision MPDUs for the same MPDU based at least in part on a bit-level combining that preserves the soft-decision information. The transmitter address (TA), recipient address (RA), and sequence number can be used to ensure combining retransmissions for a particular sequence. The soft-decision MPDUs can be stored in a memory, which in some embodiments can be indexed by address information and/or sequence number information. In some embodiments, the stored soft-decision MPDUs include probabilistic estimates for each bit of the soft-decision MPDU. In some embodiments, the stored soft-decision MPDUs are indexed by one or more of: the transmitter address (TA), the recipient address (RA), or the sequence number. The wireless device can perform a hard-decision decoding of the combined soft-decision MPDU into a hard-decision MPDU and check the data frame check sequence (FCSd) to determine if the MPDU decodes correctly. When the FCSd for the hard-decision MPDU passes, the decoded hard-decision MPDU can be provided by the PHY layer process to the MAC layer process for further processing and the combined soft-decision MPDU memory location can be cleared. When the FCSd of the hard-decision MPDU fails, the corresponding combined soft-decision MPDU (from which the hard-decision MPDU was decoded) can be stored for further combining with subsequent retransmissions for the MPDU.

Figure 6:
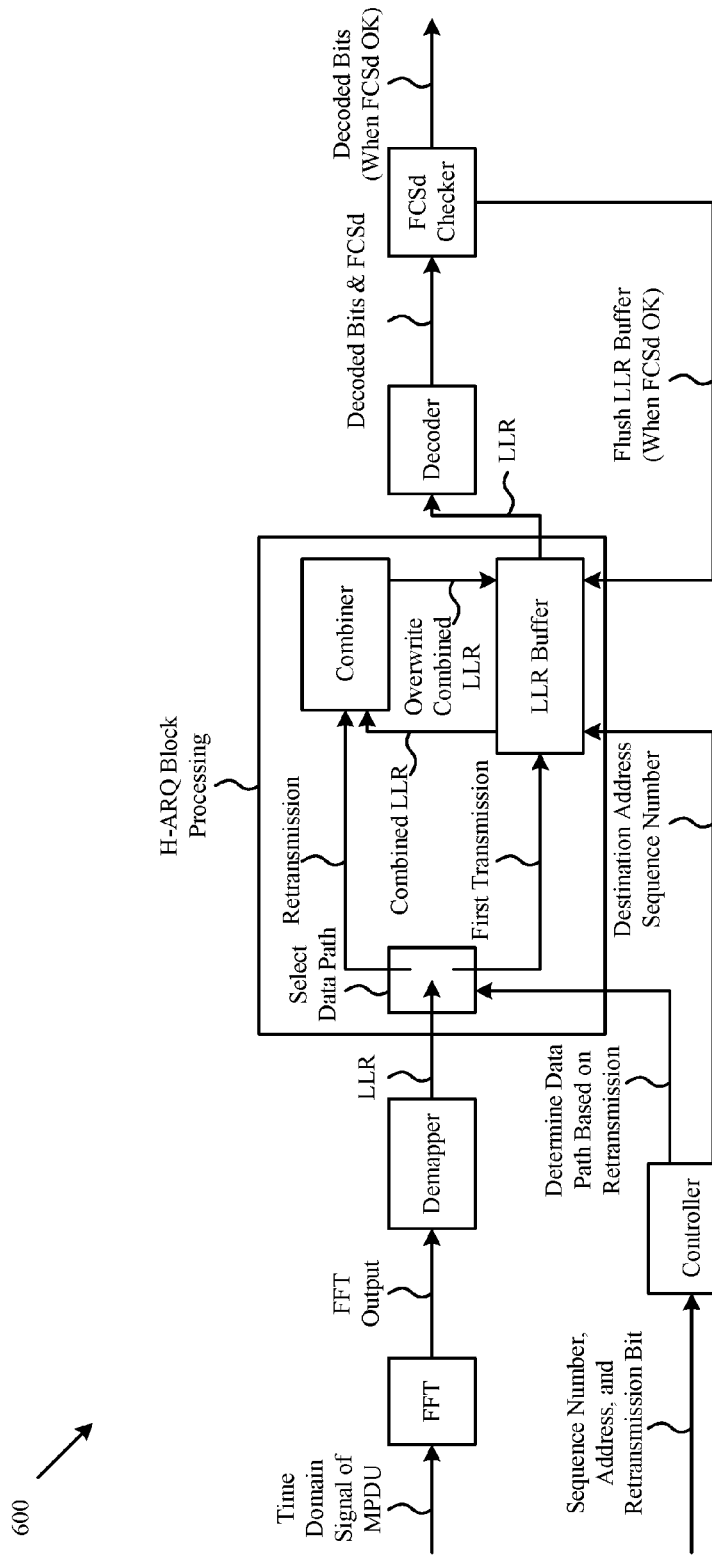
FIG. 6 illustrates a diagram of an exemplary physical (PHY) layer decoding process for a receiver of a wireless device, in accordance with some embodiments.

FIG. 6 illustrates a diagram 600 of an exemplary physical (PHY) layer decoding process for a receiver of a wireless device. A received MPDU is processed in a receiver, e.g., for a time-domain signal of an MPDU can be processed with a Fast Fourier Transform (FFT) and a demapper can output a Log-Likelihood Ratio (LLR) result that provides soft decision, probabilistic information for each bit of the MPDU. The LLR result can also be referred to herein as a soft-decision MPDU to indicate that the LLR result provides a soft-decision representation of an estimate of the bit values of the MPDU. Based at least in part on a sequence number for the MPDU, an address for the MPDU, and a retransmission indication (retransmission bit), a controller can direct the soft-decision MPDU into a data path for an initial (first) transmission or for a retransmission. The LLR (soft-decision MPDU) for an initial transmission can be decoded, by a decoder, into a set of decoded bits for the MPDU (hard-decision MPDU) and a data frame check sequence (FCSd), which can be checked to determine whether the decoded bits of the MPDU decode correctly. When the FCSd passes, indicating the decoded bits of the MPDU decoded correctly at the PHY layer, the decoded bits of the MPDU can be output by the PHY layer processing module to a MAC layer processing module of the wireless device. When the FCSd fails, indicating the decoded bits of the MPDU decoded incorrectly at the PHY layer, the LLR can be stored in a memory (e.g., a log-likelihood ratio LLR buffer) to combine with subsequent LLRs derived from retransmissions of the same MPDU. In some embodiments, storage in the LLR buffer can be indexed according to a sequence number and address information for the MPDU. In some embodiments, the PHY layer decoding process illustrated in FIGS. 5 and 6 can be performed for each MPDU of an aggregated MPDU (A-MDPU). Unlike MAC layer combining, which uses hard-decision decoded bits to combine retransmissions of an MPDU, the PHY layer combining described herein uses soft-decision information to refine estimates for each bit of an MPDU.

Figure 7:
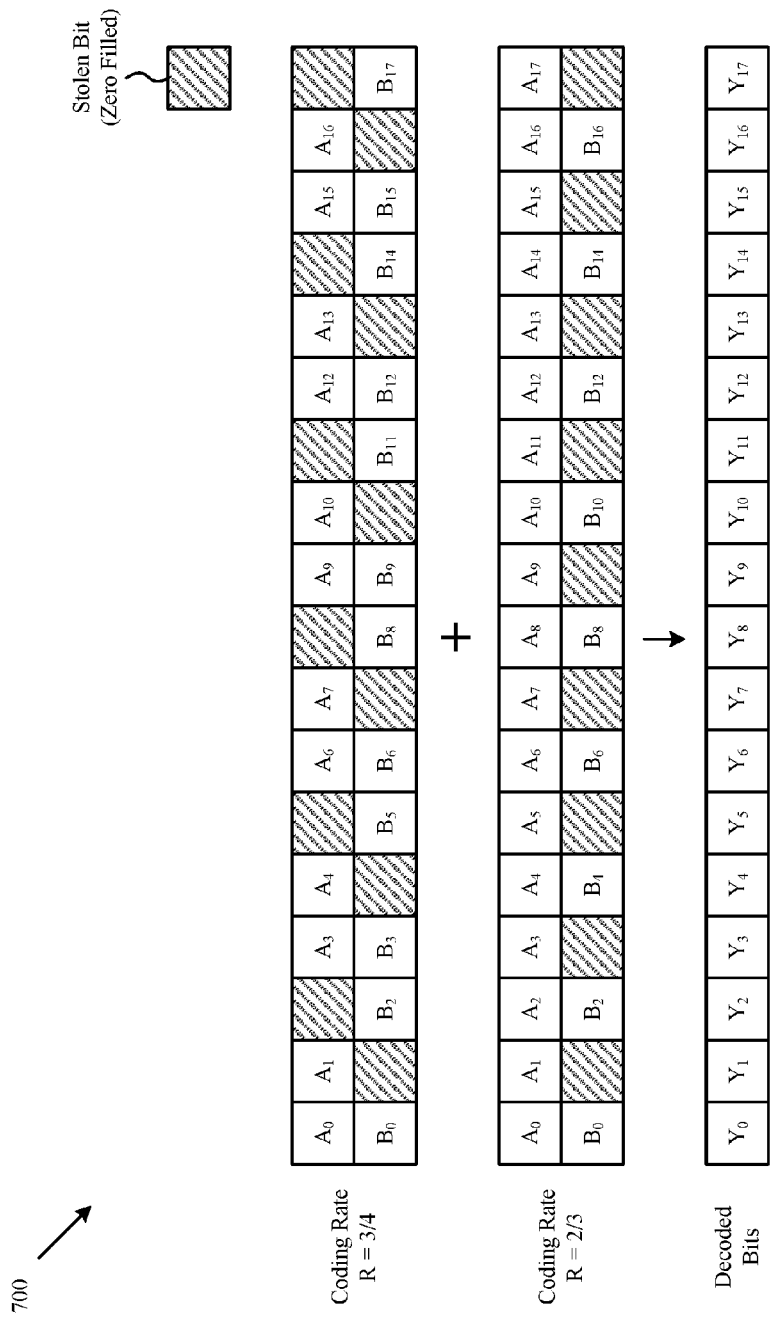
FIG. 7 illustrates an example of bit-level combining of packets that use different modulation coding schemes, in accordance with some embodiments.

In some embodiments, LLRs for different retransmissions of the same MPDU can be recombined for up to a threshold number of retransmissions. In some embodiments, the threshold number of retransmissions used for recombining can be determined based on a latency requirement or another performance criterion. In some embodiments, up to seven different retransmissions can be used to combine LLRs. In some embodiments, two different transmissions, e.g., a first transmission and a retransmission, can use different modulation and coding schemes (MCSs) with different coding rates. In some embodiments, the different MCSs can use a common coding but with different puncturing schemes that can be combined at a bit level substituting zeroes for punctured (stolen) bits at the receiver. FIG. 7 illustrates a diagram 700 of an example of bit-level combining of packets that use different modulation coding schemes (MCSs). One transmission of an MPDU can be encoded with a coding rate of R=¾, while another transmission of the same MPDU can be encoded with a coding rate of R=⅔. A identical underlying coding to produce coded bits for each MPDU (before puncturing) can delete different numbers of bits to produce the different coded bits for the MPDU. Punctured (stolen) bits can be filled with zeroes before recombining at the receiver, and soft-decision bit-level decoding can be used to combine the bits from different transmissions of the MPDU that use different MCS schemes as shown.

Figure 8:
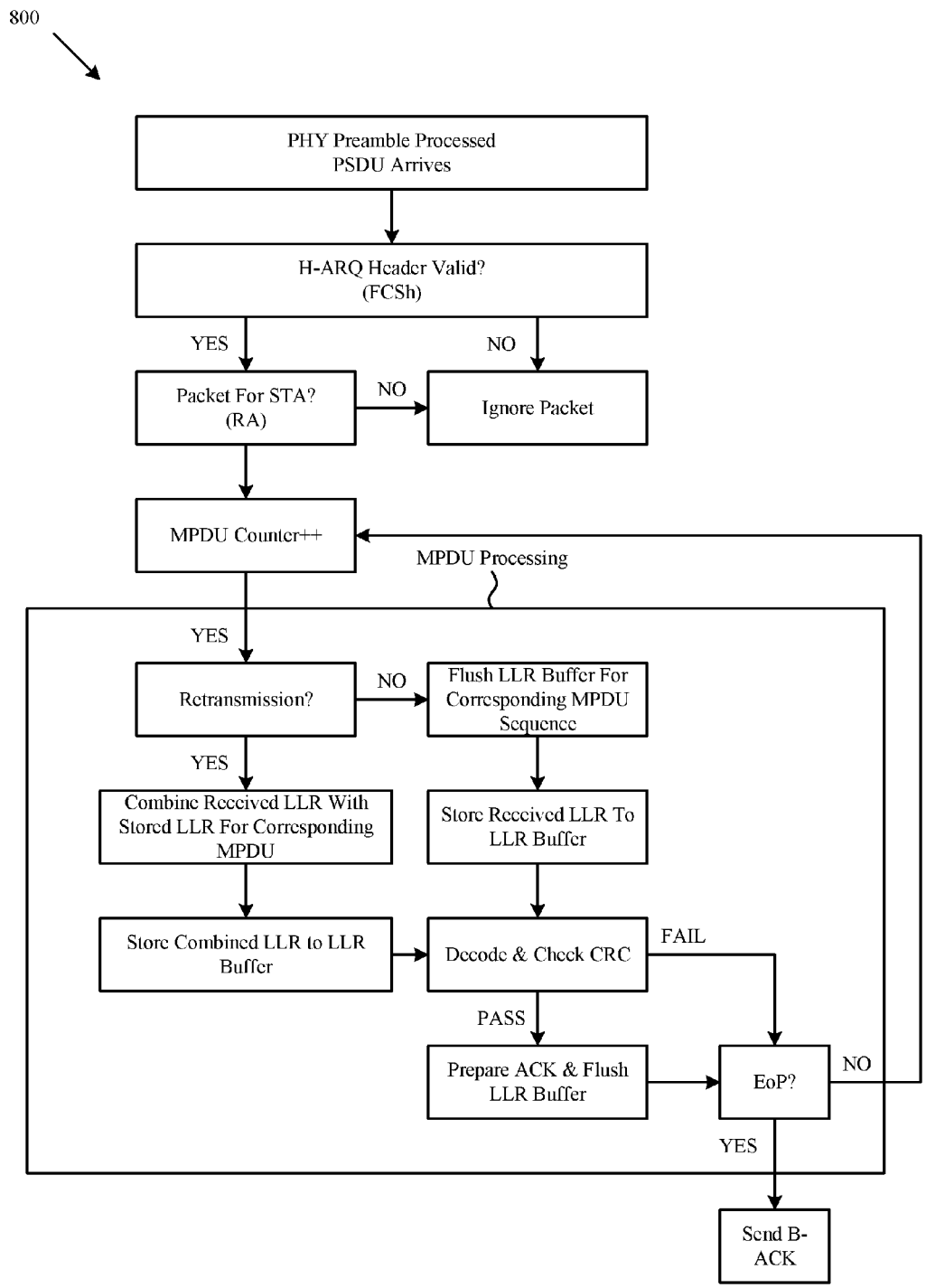
FIG. 8 illustrates a flow chart of an exemplary decoding process for a data frame, in accordance with some embodiments.

FIG. 8 illustrates a flow chart 800 of an exemplary decoding process for processing a data frame received by a wireless device. Initially a data frame (packet), which includes a PHY layer preamble and a PHY layer SDU (PSDU), which can include one or more MAC PDUs concatenated together, is received by the wireless device, and the PHY layer preamble of the data frame is processed. The wireless device checks a H-ARQ header to determine whether the data frame is received correctly, e.g., based at least in part on a header frame check sequence (FCSh). When the FCSh fails, the data frame can be ignored or discarded. When the FCSh passes, the wireless device can determine whether the data frame is addressed to the wireless device, e.g. based on a recipient address (RA). When the data frame is not addressed to the wireless device, the data frame can be ignored or discarded. When the data frame is addressed to the wireless device, the wireless device can perform processing of each of the MPDUs included in the data frame. Information in the H-ARQ header can provide an indication of the number of MPDUs included in the data frame and a counter can be used to determine when all of the MPDUs of the data frame have been processed. For each MPDU, the wireless device can determine whether then MPDU is a retransmission or an initial transmission of the MPDU, e.g., based on a retransmission bit that can be included in the H-ARQ header. When the MPDU is an initial (first) transmission, the wireless device can flush a memory for a corresponding MPDU sequence and store soft-decision information for the received MPDU in the memory. When the MPDU is a retransmission, the wireless device can combine soft-decision information for the MPDU with previously stored soft-decision information for the corresponding MPDU. The combined soft-decision MPDU can be stored in the memory to combine with future retransmissions if required. The soft-decision MPDU (from either the first transmission or the combined version from multiple transmissions) can be hard decoded into a hard-decision MPDU and a data frame check sequence (FCSd) can be checked to verify the correctness of the hard-decision MPDU. When the FCSd passes, which can indicate that the hard-decision MPDU decodes correctly, the hard-decision MPDU can be provided by the PHY layer processing module to a MAC layer processing module for further processing by the wireless device. The corresponding memory location for the soft-decision MPDU can be flushed when the FCSd passes. When the FCSd fails, which can indicate that the hard-decision MPDU decodes incorrectly (e.g., bit errors detected), the stored combined soft-decision MPDU can be retained for further combining with additional, future retransmissions of the MPDU. When all of the MPDUs of the data frame are processed (indicated as EoP or "end of packet"), the wireless device can send a block acknowledgement (B-ACK) for the data frame, where correctly decoded MPDUs are acknowledged (ACKed) and incorrectly decoded MPDUs are negative acknowledged (NACKed).

Figure 9:
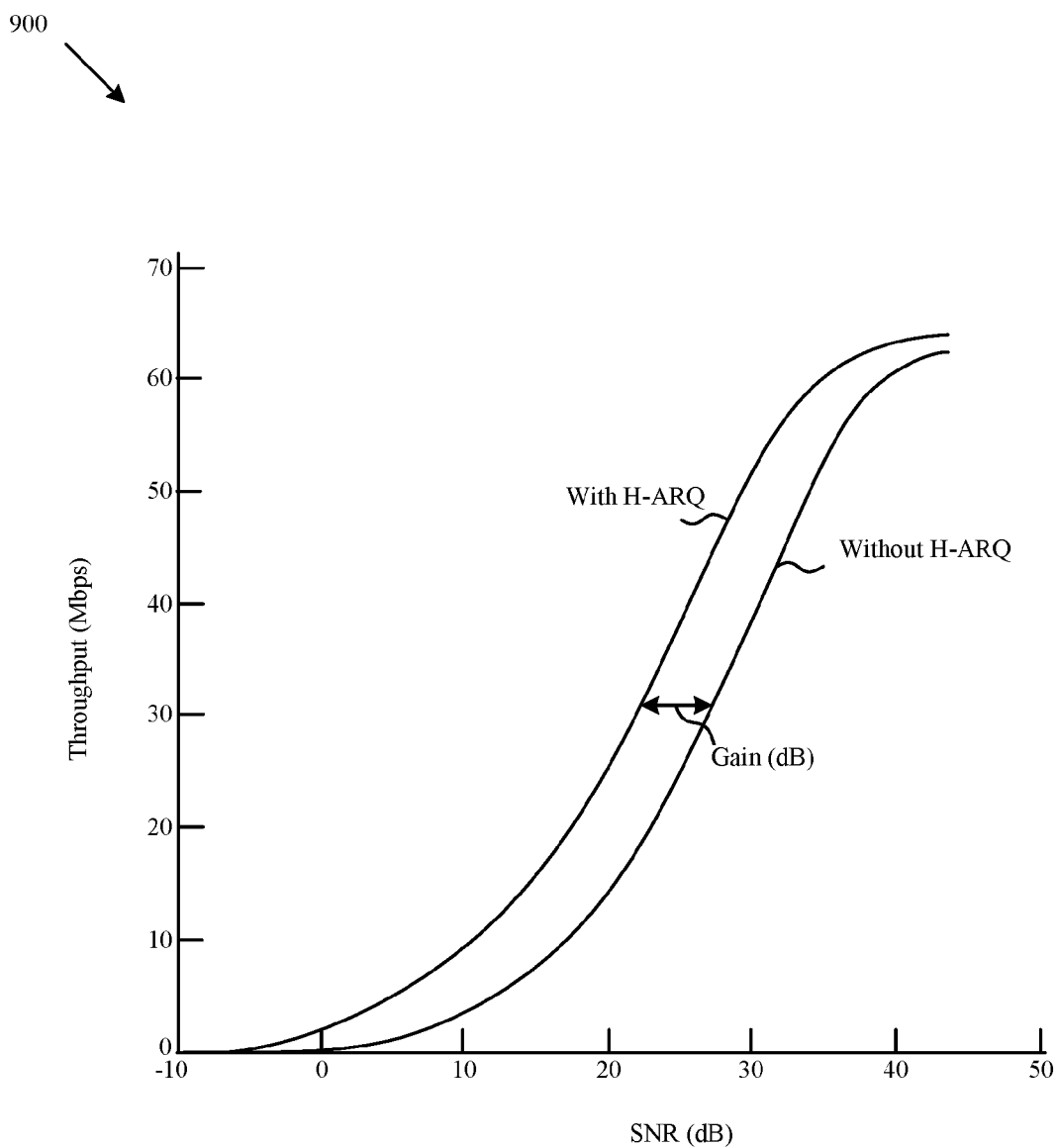
FIG. 9 illustrates a chart of an exemplary throughput performance with and without a H-ARQ retransmission process, in accordance with some embodiments.

FIG. 9 illustrates a chart 900 of an exemplary throughput performance with and without a H-ARQ retransmission process as described herein. For the same signal-to-noise ratio (SNR) value, a higher level of throughput can be achieved with the use of the H-ARQ soft-decision MPDU combining process described herein than without the use of the H-ARQ soft-decision MPDU combining process. As shown, for the same throughput level, a gain of approximately 3 to 4 dB can be realized with the use of the H-ARQ soft-decision MPDU combining process.

Figure 10:
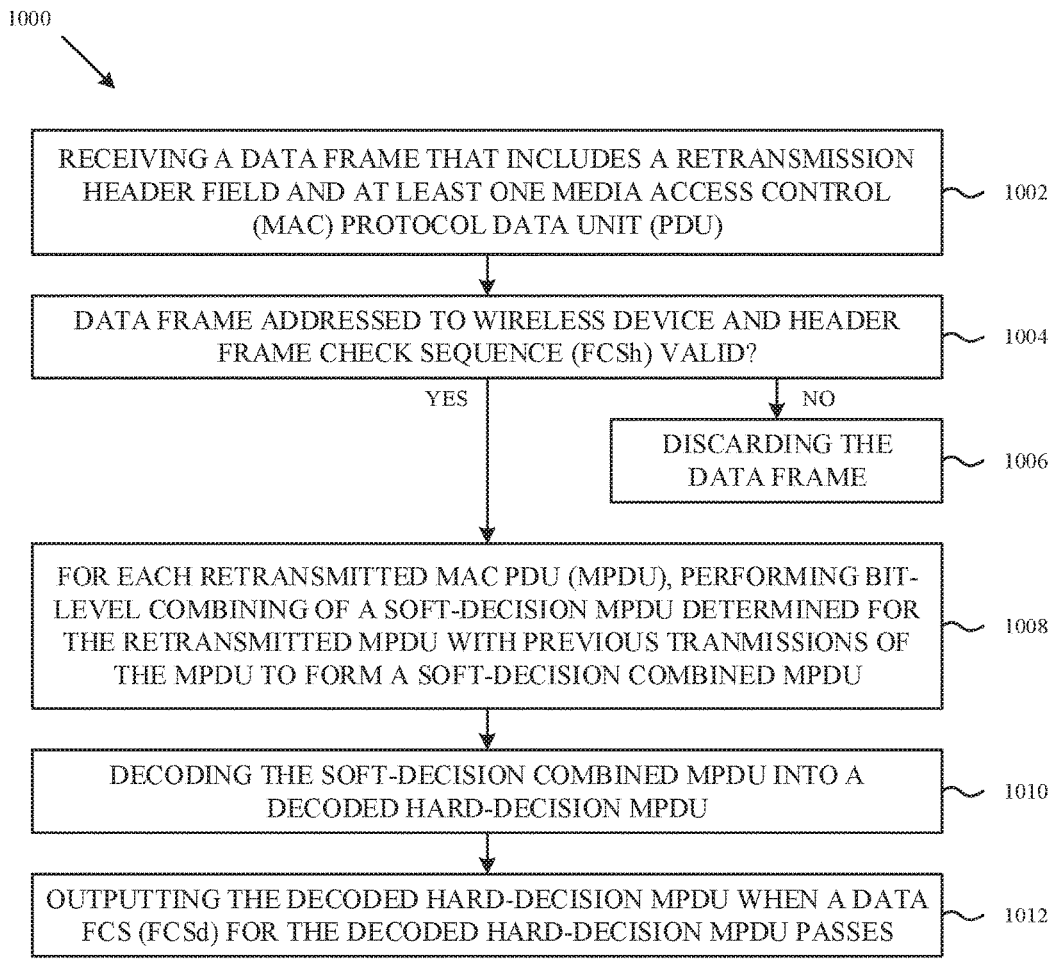
FIG. 10 illustrates a flow chart of an exemplary method for soft-decision decoding with retransmission, in accordance with some embodiments.

FIG. 10 illustrates a flow chart 1000 of an exemplary method for soft-decision decoding with retransmission, which can be performed by a wireless device. At 1002, the wireless device receives a data frame that includes a retransmission header field, e.g., a H-ARQ header, and at least one media access control (MAC) protocol data unit (PDU) or MPDU. At 1004, the wireless device determines whether the data frame is addressed to the wireless device, e.g., based on a recipient address (RA) or other address information included in the data frame. Further, at 1004, the wireless device determines whether a header frame check sequence (FCSh) for the retransmission header field is valid, e.g., whether the FCSh passes or fails. When the data frame is not addressed to the wireless device or the FCSh fails, which can indicate that at least a portion of the retransmission header of the received data frame is not reliable for decoding, the wireless device, at 1006, discards (or ignores) the data frame. When the data frame is addressed to the wireless device and the FCSh passes, at 1008, the wireless device performs a physical (PHY) layer processing of retransmitted MPDUs of the data frame. For each retransmitted MPDU, the wireless device performs a bit-level combining of a soft-decision MPDU determined for the retransmitted MPDU with previous transmissions of the MPDU to form a soft-decision combined MPDU. The previous transmissions of the MPDU can be previous soft-decision MPDUs that are stored in a memory of the wireless device. At 1010, the wireless device decodes the soft-decision combined MPDU into a decoded hard-decision MPDU. At 1012, the wireless device outputs (e.g., provides to a MAC layer processing module by the PHY layer processing module) the decoded hard-decision MPDU when a data frame check sequence (FCSd) for the decoded hard-decision MPDU passes.

Figure 11:
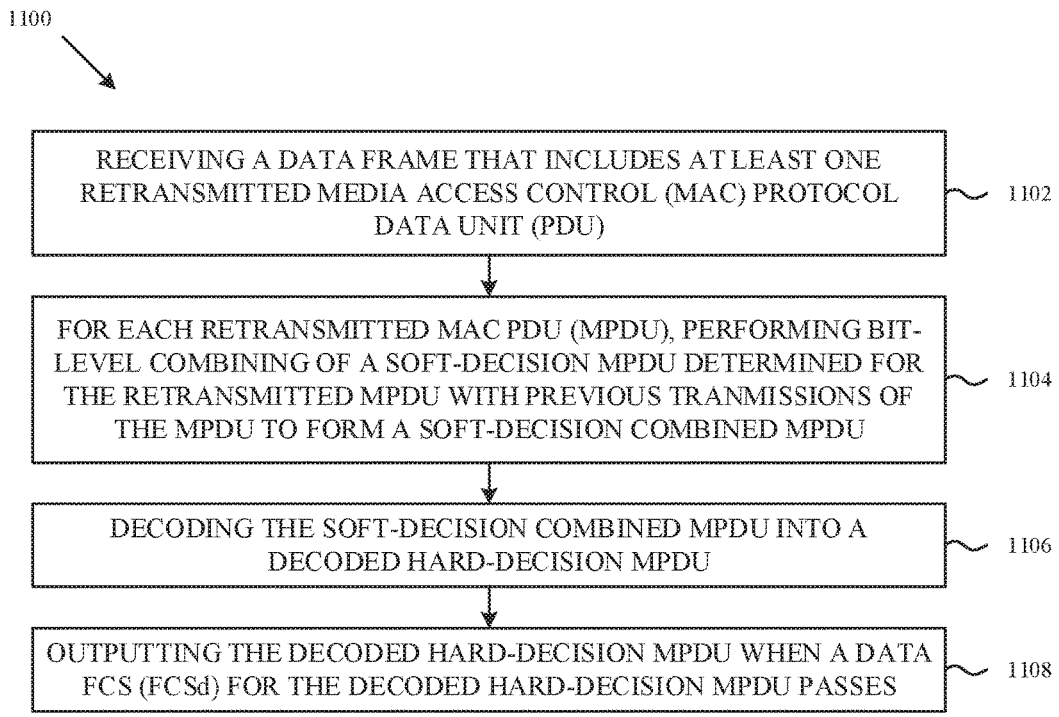
FIG. 11 illustrates a flow chart of another exemplary method for soft-decision decoding with retransmission, in accordance with some embodiments.

FIG. 11 illustrates a flow chart 1100 of another exemplary method for soft-decision decoding with retransmission, which can be performed by a wireless device. At 1102, the wireless device receives a data frame that includes at least one retransmitted MPDU. At 1104, the wireless device performs a bit-level combining of a soft-decision MPDU determined for the retransmitted MPDU with previous transmissions of the MPDU (e.g., previous determined soft-decision MPDUs) to form a soft-decision combined MPDU. At 1106, the wireless device decodes the soft-decision combined MPDU into a decoded hard decision MPDU. At 1108, the wireless device outputs (e.g., provides from a PHY layer to a MAC layer) the decoded hard-decision MPDU when a data frame check sequence (FCSd) for the decoded hard-decision MPDU passes.

In an embodiment, a method for soft-decision decoding with retransmission, performed by a wireless device, includes: receiving a data frame that includes a retransmission header field and at least one media access control (MAC) protocol data unit (PDU). The method further includes, when the data frame is addressed to the wireless device and a header frame check sequence (FCSh) for the retransmission header field passes: for each retransmitted MAC PDU (MPDU) of the data frame, performing bit-level combining of a soft-decision MPDU determined for the retransmitted MPDU with previous transmissions of the MPDU to form a soft-decision combined MPDU; decoding the soft-decision combined MPDU into a decoded hard-decision MPDU; and outputting the decoded hard-decision MPDU when a data FCS (FCSd) for the decoded hard-decision MPDU passes. The method further includes, when the data frame is not addressed to the wireless device or the FCSh for the retransmission header field fails, discarding (or ignoring) the data frame.

In some embodiments, the method further includes the wireless device determining whether the data frame is addressed to the wireless device based at least in part on a receive MAC address included in the retransmission header field. In some embodiments, the method further includes the wireless device, when the data frame is addressed to the wireless device and the FCSh for the retransmission header field passes, for each initially transmitted MPDU of the data frame: decoding a soft-decision MPDU determined for the initially transmitted MPDU into a corresponding decoded hard-decision MPDU for the initially transmitted MPDU; outputting the decoded hard-decision MPDU for the initially transmitted MPDU when the FCSd of the initially transmitted MPDU passes; and storing the soft-decision MPDU determined for the initially transmitted MPDU to use for soft-decision combining with subsequent retransmissions of the MPDU, when the FCSd of the initially transmitted MPDU fails. In some embodiments, the method further includes for each retransmitted MPDU of the data frame, storing the soft-decision combined MPDU when the FCSd for the decoded hard-decision MPDU fails. In some embodiments, the method further includes discarding the soft-decision combined MPDU (or flushing an associated portion of a memory or storage medium) when the FCSd for the decoded hard-decision MPDU passes. In some embodiments, the wireless device performs bit-level soft-decision combining separately for retransmitted MPDUs that originate from different transmitters. In some embodiments, the retransmission header field includes a transmit MAC address, and the method further includes identifying an originating transmitter for the retransmitted MPDU based at least in part on a MAC transmit address included in the retransmission header field. In some embodiments, the data frame includes multiple MPDUs, and the retransmission header field includes sequence number information for the multiple MPDUs. In some embodiments, the sequence number information includes an initial sequence number of an MPDU of the multiple MPDUs of the data frame and a sequence number offset bit map for a remainder of the multiple MPDUs. In some embodiments, the soft-decision MPDU includes a probabilistic estimate for each bit of the MPDU. In some embodiments, the decoded hard-decision MPDU includes a binary value for each bit of the MPDU. In some embodiments, a retransmitted MPDU of the data frame uses a different modulation coding scheme (MCS) from a corresponding initially transmitted MPDU. In some embodiments, outputting the decoded hard-decision MPDU includes providing the decoded hard-decision MPDU, by a physical (PHY) layer processing module, to a MAC layer processing module for further processing of the decoded hard-decision MPDU.

In an embodiment, a wireless device includes wireless circuitry coupled to one or more antennas; one or more processors coupled to the wireless circuitry; and a memory coupled to the one or more processors storing instructions that, when executed by the one or more processors, cause the wireless device to process a data frame that includes at least one retransmitted media access control (MAC) protocol data unit (PDU) received from an other wireless device by: for each retransmitted MAC PDU (MPDU) of the data frame, performing bit-level combining of a soft-decision MPDU determined for the retransmitted MPDU with previous transmissions of the MPDU to form a soft-decision combined MPDU; decoding the soft-decision combined MPDU into a decoded hard-decision MPDU; and outputting the decoded hard-decision MPDU when a data frame check sequence (FCSd) for the decoded hard-decision MPDU passes.

In some embodiments, outputting the decoded hard-decision MPDU includes providing the decoded hard-decision MPDU, by a physical (PHY) layer processing module, to a MAC layer processing module for further processing of the decoded hard-decision MPDU. In some embodiments, the wireless device further processes the data frame received from the other wireless device by: for each initially transmitted MPDU of the data frame, decoding a soft-decision MPDU determined for the initially transmitted MPDU into a corresponding decoded hard-decision MPDU for the initially transmitted MPDU; outputting the decoded hard-decision MPDU for the initially transmitted MPDU when the FCSd of the initially transmitted MPDU passes; and storing the soft-decision MPDU determined for the initially transmitted MPDU to use for soft-decision combining with subsequent retransmissions of the MPDU, when the FCSd of the initially transmitted MPDU fails. In some embodiments, the wireless device further processes the data frame received from the other wireless device by: for each retransmitted MPDU of the data frame, storing the soft-decision combined MPDU when the FCSd for the decoded hard-decision MPDU fails. In some embodiments, the wireless device further processes the data frame received from the other wireless device by: discarding (or ignoring) the soft-decision combined MPDU when the FCSd for the decoded hard-decision MPDU passes. In some embodiments, the data frame includes a retransmission header that includes a header frame check sequence (FCSh); and the wireless device further processes the data frame received from the other wireless device by discarding (or ignoring) the data frame when the FCSh for the retransmission header fails.

In an embodiment, a non-transitory computer-readable storage medium storing instructions that, when executed by a processor of a wireless device, cause the wireless device to: receive a data frame that includes a retransmission header field and at least one media access control (MAC) protocol data unit (PDU); when a header frame check sequence (FCSh) for the retransmission header field passes: for each retransmitted MAC PDU (MPDU) of the data frame, perform bit-level combining of a soft-decision MPDU determined for the retransmitted MPDU with previous transmissions of the MPDU to form a soft-decision combined MPDU; decode the soft-decision combined MPDU into a decoded hard-decision MPDU; and output the decoded hard-decision MPDU when a data FCS (FCSd) for the decoded hard-decision MPDU passes; and discard the data frame when the FCSh for the retransmission header field fails.

In an embodiments, an apparatus for soft-decision decoding with retransmission by a wireless device includes: means for receiving a data frame that includes a retransmission header field and at least one media access control (MAC) protocol data unit (PDU); and means for processing data frames by performing a method that includes: when the data frame is addressed to the wireless device and a header frame check sequence (FCSh) for the retransmission header field passes; for each retransmitted MAC PDU (MPDU) of the data frame, performing bit-level combining of a soft-decision MPDU determined for the retransmitted MPDU with previous transmissions of the MPDU to form a soft-decision combined MPDU; decoding the soft-decision combined MPDU into a decoded hard-decision MPDU; and outputting the decoded hard-decision MPDU when a data FCS (FCSd) for the decoded hard-decision MPDU passes; and means for discarding the data frame when the data frame is not addressed to the wireless device or the FCSh for the retransmission header field fails.

Figure 12:
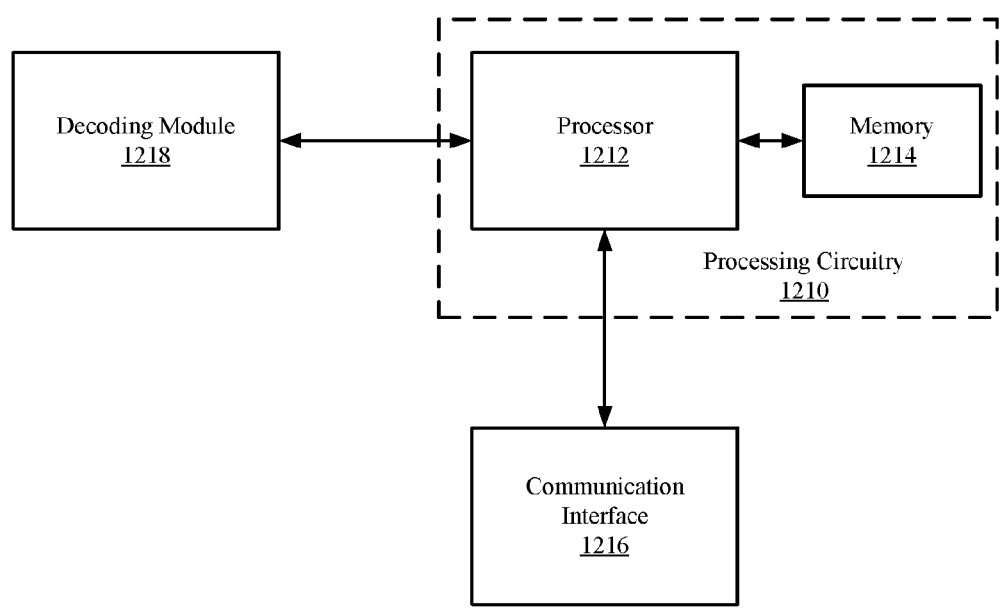
FIG. 12 illustrates a block diagram of an exemplary apparatus that can be implemented on a WLAN station, in accordance with some embodiments.

FIG. 12 illustrates a block diagram 1200 of an exemplary apparatus that can be implemented on a STA 102, in accordance with some embodiments. In this regard, when implemented on a computing device, such as the STA 102, the exemplary apparatus can enable the computing device to operate within a WLAN, such as the WLAN 104, in accordance with some embodiments. It will be appreciated that the components, devices or elements illustrated in and described with respect to FIG. 12 may not be mandatory and thus some may be substituted for or omitted in certain embodiments. Additionally, some embodiments can include further or different components, devices or elements beyond those illustrated in and described with respect to FIG. 12.

In some embodiments, the exemplary apparatus illustrated by the block diagram 1200 of FIG. 12 can include processing circuitry 1210 that is configurable to perform actions in accordance with one or more embodiments disclosed herein. In this regard, the processing circuitry 1210 can be configured to perform and/or control performance of one or more functionalities of the apparatus illustrated by the block diagram 1200 in accordance with some embodiments, and thus can provide means for performing functionalities of the apparatus in accordance with various embodiments. In some embodiments, the processing circuitry 1210 can be configured to perform data processing, application execution and/or other processing and management services.

In some embodiments, the apparatus illustrated by the block diagram 1200 or a portion(s) or component(s) thereof, such as the processing circuitry 1210, can include one or more chipsets, which can each include one or more chips. The processing circuitry 1210 and/or one or more further components of the apparatus can therefore, in some instances, be configured to implement an embodiment on a chipset including one or more chips. In some embodiments in which one or more components of the apparatus of the block diagram 1200 illustrated in FIG. 12 are embodied as a chipset, the chipset can be capable of enabling a computing device to operate in the example system 100 when implemented on or otherwise operably coupled to the computing device. Thus, for example, one or more components of the apparatus can provide a chipset configured to enable a computing device to operate on a WLAN, such as WLAN 104, in accordance with one or more example embodiments.

In some example embodiments, the processing circuitry 1210 can include a processor 1212 and, in some embodiments, such as that illustrated in FIG. 12, can further include memory 1214. The processing circuitry 1210 can be in communication with or otherwise control a communication interface 1216, and/or a decoding module 1218. The processor 1212 can be embodied in a variety of forms. For example, the processor 1212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 1212 can comprise a plurality of processors. The plurality of processors can be in operative communication with each other and can be collectively configured to perform one or more functionalities of the apparatus of the block diagram 1200 as described herein. In some example embodiments, the processor 1212 can be configured to execute instructions that can be stored in the memory 1214 or that can be otherwise accessible to the processor 1212. As such, whether configured by hardware or by a combination of hardware and software, the processor 1212 can be capable of performing operations according to various embodiments while configured accordingly.

In some example embodiments, the memory 1214 can include one or more memory devices. Memory 1214 can include fixed and/or removable memory devices. In some embodiments, the memory 1214 can provide a non-transitory computer-readable storage medium that can store computer program instructions that can be executed by the processor 1212. In this regard, the memory 1214 can be configured to store information, data, applications, instructions and/or the like for enabling the apparatus of the block diagram 1200 to carry out various functions in accordance with one or more example embodiments. In some embodiments, the memory 1214 can be in communication with one or more of the processor 1212, communication interface 1216, or absence control module 1218 via a bus(es) for passing information among components of the apparatus.

The apparatus illustrated in block diagram 1200 can further include the communication interface 1216. The communication interface 1216 can include wireless circuitry configurable to provide one or more interface mechanisms for enabling communication with other devices and/or networks. For example, the communication interface 1216 can include a transceiver configured to enable the apparatus to send wireless signals to and receive signals via one or more antennas as part of communication within a WLAN, such as WLAN 104. The communication interface 1216 can accordingly be configured in embodiments in which the apparatus is implemented on the STA 102 to enable the STA 102 to send signals to and receive signals from the AP 106. In various example embodiments, the communication interface 1216 can additionally or alternatively include, for example, an antenna (or multiple antennas) and supporting hardware and/or software for enabling communications with one or more further wireless communication networks, such as a cellular network, and/or a communication modem or other hardware/software for supporting communication via cable, digital subscriber line (DSL), USB, FireWire, Ethernet or other wireline networking methods.

The apparatus of the block diagram 1200 illustrated in FIG. 12 can further include the decoding module 1218. The decoding module 1218 can be embodied as various means, such as circuitry, hardware, a computer program product comprising a computer readable medium (for example, the memory 1214) storing computer readable program instructions executable by a processing device (for example, the processor 1212), or some combination thereof. In some embodiments, the processor 1212 (or the processing circuitry 1210) can include, or otherwise control the decoding module 1218. In some embodiments, the decoding module 1218 can identify retransmissions of MPDUs in WLAN packets, and can store and/or combine soft decoding information for MPDUs that are retransmitted to improve decoding of the MPDUs. In some embodiments, the decoding module 1218 can parse a WLAN packet as formatted and described herein to determine whether portions of the WLAN packet are intended for the apparatus, e.g., for a STA 102, whether the portions of the WLAN packet include error in header fields and/or data fields, and to use soft decoding techniques to improve decoding of the portions of the WLAN packet.

Figure 13:
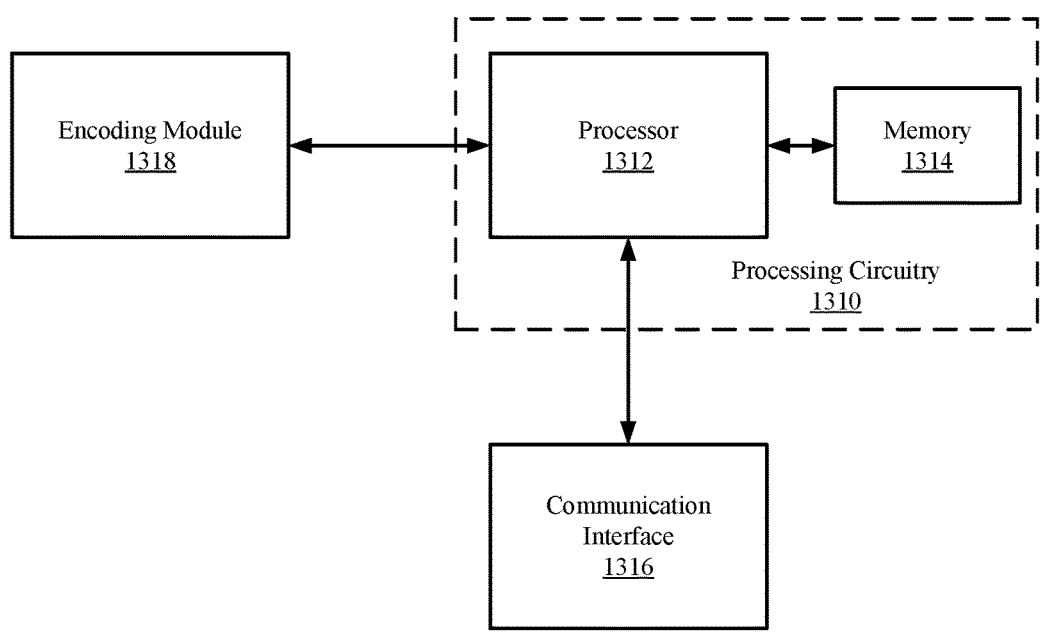
FIG. 13 illustrates a block diagram of an exemplary apparatus that can be implemented on a WLAN access point, in accordance with some embodiments.

FIG. 13 illustrates a block diagram 1300 of an exemplary apparatus that can be implemented on a WLAN access point, such as AP 106, in accordance with some embodiments. In this regard, when implemented on a computing device, such as AP 106, the apparatus of block diagram 1300 can enable the computing device to function as an access point for a WLAN, such as WLAN 104, in accordance with some embodiments. It will be appreciated that the components, devices or elements illustrated in and described with respect to FIG. 13 may not be mandatory and thus some may be omitted in certain embodiments. Additionally, some embodiments can include further or different components, devices or elements beyond those illustrated in and described with respect to FIG. 13.

In some embodiments, the apparatus of block diagram 1300 can include processing circuitry 1310 that is configurable to perform actions in accordance with one or more example embodiments disclosed herein. In this regard, the processing circuitry 1310 can be configured to perform and/or control performance of one or more functionalities of the apparatus of block diagram 1300 in accordance with various embodiments, and thus can provide means for performing functionalities of the apparatus of block diagram 1300 in accordance with various example embodiments. The processing circuitry 1310 can be configured to perform data processing, application execution and/or other processing and management services according to one or more example embodiments.

In some embodiments, the apparatus illustrated by the block diagram 1300 or a portion(s) or component(s) thereof, such as the processing circuitry 1310, can include one or more chipsets, which can each include one or more chips. The processing circuitry 1310 and/or one or more further components of the apparatus illustrated by the block diagram 1300 can therefore, in some instances, be configured to implement an embodiment on a chipset including one or more chips. In some example embodiments in which one or more components of the apparatus of block diagram 1300 are embodied as a chipset, the chipset can be capable of enabling a computing device to function as a WLAN access point, such as the AP 106 in the example system 100.

In some embodiments, the processing circuitry 1310 can include a processor 1312 and, in some embodiments, such as that illustrated in FIG. 13, can further include memory 1314. The processing circuitry 1310 can be in communication with or otherwise control the communication interface 1316, and/or the encoding module 1318. The processor 1312 can be embodied in a variety of forms. For example, the processor 1312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 1312 can comprise a plurality of processors. The plurality of processors can be in operative communication with each other and can be collectively configured to perform one or more functionalities of the apparatus 1300 as described herein. In some embodiments, the processor 1312 can be configured to execute instructions that can be stored in the memory 1314 or that can be otherwise accessible to the processor 1312. As such, whether configured by hardware or by a combination of hardware and software, the processor 1312 can be capable of performing operations according to various embodiments while configured accordingly.

In some embodiments, the memory 1314 can include one or more memory devices. Memory 1314 can include fixed and/or removable memory devices. In some embodiments, the memory 1314 can provide a non-transitory computer-readable storage medium that can store computer program instructions that can be executed by the processor 1312. In this regard, the memory 1314 can be configured to store information, data, applications, instructions and/or the like for enabling the apparatus 1300 to carry out various functions in accordance with one or more example embodiments. In some embodiments, the memory 1314 can be in communication with one or more of the processor 1312, communication interface 1316, or encoding module 1318 via a bus(es) for passing information among components of the apparatus illustrated by the block diagram 1300 of FIG. 13.

The apparatus illustrated in the block diagram 1300 can further include a communication interface 1316. The communication interface 1316 can include one or more interface mechanisms for enabling communication with other devices and/or networks. For example, the communication interface 1316 can include a transceiver configured to enable the apparatus illustrated by the block diagram 1300 to send wireless signals to and receive signals from a WLAN, such as the WLAN 104. The communication interface 1316 can accordingly be configured in embodiments in which the apparatus is implemented on the AP 106 to enable the AP 106 to function as an access point for the WLAN 104 and to send signals to and receive signals from stations on the WLAN 104, such as to and from the STA 102. In various example embodiments, the communication interface 1316 can additionally or alternatively include, for example, an antenna (or multiple antennas) and supporting hardware and/or software for enabling communications with one or more further wireless communication networks and/or a communication modem or other hardware/software for supporting communication via cable, digital subscriber line (DSL), USB, FireWire, Ethernet or other wireline networking methods.

The apparatus 1300 can further include encoding module 1318. The encoding module 1318 can be embodied as various means, such as circuitry, hardware, a computer program product comprising a computer readable medium (for example, the memory 1314) storing computer readable program instructions executable by a processing device (for example, the processor 1312), or some combination thereof. In some embodiments, the processor 1312 (or the processing circuitry 1310) can include, or otherwise control the encoding module 1318.

The encoding module 1318 can be configured in some embodiments to cause an access point, e.g., AP 106, to format a message, such as a WLAN packet, in accordance with a packet structure illustrated herein. The encoding module 1318 can retransmit individual MAC PDUs of a WLAN packet based on reception of an acknowledgement (ACK) or negative acknowledgement (NACK) or another feedback mechanism, in some embodiments. The encoding module 1318 can format the WLAN packet to indicate which MAC PDUs are first transmissions and which MAC PDUs are retransmissions. In some embodiments, the encoding module 1318 formats the WLAN packet to include a single MAC PDU, while in some embodiments, the encoding module 1318 formats the WLAN packet to include multiple MAC PDUs. In some embodiments, the WLAN packet is formatted to include a H-ARQ header that provides an indication of retransmissions. In some embodiments, the WLAN packet is formatted to include byte lengths for the MAC PDUs and to not include delimiters between multiple MAC PDUs. In some embodiments, the WLAN packet is formatted to shorten or eliminated MAC headers from the MAC PDUs.

It will be appreciated that while various disclosed embodiments have been described in terms of WLAN access points and WLAN stations, embodiments are not limited to application within structured WLAN networks including an access point (AP). In this regard, the disclosed ideas can also be implemented, mutatis mutandis, to support scheduled absence between two non-AP WLAN stations that may be operating in an ad hoc mode and/or in any type of peer-to-peer WLAN-based scenario. Further, while the disclosure describes various example embodiments being applied to WLAN technology, it will be appreciated that the disclosed techniques can also be applied, mutatis mutandis, to any type of wireless communication technology, including, for example, cellular communications, Bluetooth, Zigbee, Wi-Max, and/or other wireless communication technology.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling wireless communication of an electronic device. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for soft-decision decoding with retransmission, the method comprising:
   by a wireless device:
   receiving a data frame that includes a retransmission header field and at least one media access control (MAC) protocol data unit (PDU);
   when the data frame is addressed to the wireless device and a header frame check sequence (FCSh) for the retransmission header field passes:
     for each initially transmitted MAC PDU (MPDU) of the data frame:
       decoding a soft-decision MPDU for the initially transmitted MPDU into a decoded hard-decision MPDU for the initially transmitted MPDU;
       outputting the decoded hard-decision MPDU for the initially transmitted MPDU, when a data FCS (FCSd) of the initially transmitted MPDU passes; and
       storing the soft-decision MPDU for the initially transmitted MPDU to use for soft-decision combining with subsequent retransmissions of the MPDU, when the FCSd of the initially transmitted MPDU fails; and
     for each retransmitted MPDU of the data frame:
       performing bit-level combining of the soft-decision MPDU for the retransmitted MPDU with previous transmissions of the MPDU to form a soft-decision combined MPDU;
       decoding the soft-decision combined MPDU into the decoded hard-decision MPDU for the retransmitted MPDU; and
       outputting the decoded hard-decision MPDU for the retransmitted MPDU when the FCSd for the decoded hard-decision MPDU for the retransmitted MPDU passes; and
   when the data frame is not addressed to the wireless device or the FCSh for the retransmission header field fails, discarding the data frame.

2. The method of claim 1, further comprising:
   by the wireless device:
   determining whether the data frame is addressed to the wireless device based at least in part on a receive MAC address included in the retransmission header field.

3. The method of claim 1, further comprising:
   for each retransmitted MPDU of the data frame, storing the soft-decision combined MPDU when the FCSd for the decoded hard-decision MPDU for the retransmitted MPDU fails.

4. The method of claim 3, further comprising:
   discarding the soft-decision combined MPDU when the FCSd for the decoded hard-decision MPDU for the retransmitted MPDU passes.

5. The method of claim 1, wherein the wireless device performs bit-level soft-decision combining separately for retransmitted MPDUs that originate from different transmitters.

6. The method of claim 5, wherein:
   the retransmission header field includes a transmit MAC address, and
   the method further comprises identifying an originating transmitter for the retransmitted MPDU based at least in part on a MAC transmit address included in the retransmission header field.

7. The method of claim 1, wherein:
   the data frame comprises a plurality of MPDUs; and
   the retransmission header field comprises sequence number information for the plurality of MPDUs.

8. The method of claim 7, wherein the sequence number information comprises an initial sequence number of an MPDU of the plurality of MPDUs of the data frame and a sequence number offset bit map for a remainder of the plurality of MPDUs.

9. The method of claim 1, wherein soft-decision MPDUs comprise a probabilistic estimate for each bit of corresponding MPDUs.

10. The method of claim 1, wherein decoded hard-decision MPDUs comprise a binary value for each bit of corresponding MPDUs.

11. The method of claim 1, wherein a retransmitted MPDU of the data frame uses a different modulation coding scheme (MCS) from a corresponding initially transmitted MPDU.

12. The method of claim 1, wherein outputting the decoded hard-decision MPDU comprises providing the decoded hard-decision MPDU, by a physical (PHY) layer processing module, to a MAC layer processing module for further processing of the decoded hard-decision MPDU.

13. A wireless device comprising:
   wireless circuitry coupled to one or more antennas;
   one or more processors coupled to the wireless circuitry; and
   a memory coupled to the one or more processors storing instructions that, when executed by the one or more processors, cause the wireless device to process a data frame that includes at least one retransmitted media access control (MAC) protocol data unit (PDU) received from an other wireless device by:
     for each initially transmitted MAC PDU (MPDU) of the data frame:
       decoding a soft-decision MPDU for the initially transmitted MPDU into a decoded hard-decision MPDU for the initially transmitted MPDU;
       outputting the decoded hard-decision MPDU for the initially transmitted MPDU when a data frame check sequence (FCSd) of the initially transmitted MPDU passes; and storing the soft-decision MPDU for the initially transmitted MPDU to use for soft-decision combining with subsequent retransmissions of the MPDU, when the FCSd of the initially transmitted MPDU fails; and for each retransmitted MPDU of the data frame:
performing bit-level combining of the soft-decision MPDU for the retransmitted MPDU with previous transmissions of the MPDU to form a soft-decision combined MPDU;
decoding the soft-decision combined MPDU into the decoded hard-decision MPDU for the retransmitted MPDU; and
outputting the decoded hard-decision MPDU for the retransmitted MPDU when the FCSd for the decoded hard-decision MPDU for the retransmitted MPDU passes.

14. The wireless device of claim 13, outputting the decoded hard-decision MPDU comprises providing the decoded hard-decision MPDU, by a physical (PHY) layer processing module, to a MAC layer processing module for further processing of the decoded hard-decision MPDU.

15. The wireless device of claim 13, wherein the wireless device further processes the data frame received from the other wireless device by:
for each retransmitted MPDU of the data frame, storing the soft-decision combined MPDU when the FCSd for the decoded hard-decision MPDU for the retransmitted MPDU fails.

16. The wireless device of claim 15, wherein the wireless device further processes the data frame received from the other wireless device by:
discarding the soft-decision combined MPDU when the FCSd for the decoded hard-decision MPDU for the retransmitted MPDU passes.

17. The wireless device of claim 13, wherein:
the data frame comprises a retransmission header that includes a header frame check sequence (FCSh); and
the wireless device further processes the data frame received from the other wireless device by discarding the data frame when the FCSh for the retransmission header fails.

18. A non-transitory computer-readable storage medium storing instructions that, when executed by a processor of a wireless device, cause the wireless device to:
receive a data frame that includes a retransmission header field and at least one media access control (MAC) protocol data unit (PDU);
when a header frame check sequence (FCSh) for the retransmission header field passes:
for each initially transmitted MAC PDU (MPDU) of the data frame:
decode a soft-decision MPDU for the initially transmitted MPDU into a decoded hard-decision MPDU for the initially transmitted MPDU;
output the decoded hard-decision MPDU for the initially transmitted MPDU when a data frame check sequence (FCSd) of the initially transmitted MPDU passes; and
store the soft-decision MPDU for the initially transmitted MPDU to use for soft-decision combining with subsequent retransmissions of the MPDU, when the FCSd of the initially transmitted MPDU fails; and
for each retransmitted MPDU of the data frame:
perform bit-level combining of the soft-decision MPDU for the retransmitted MPDU with previous transmissions of the MPDU to form a soft-decision combined MPDU;
decode the soft-decision combined MPDU into the decoded hard-decision MPDU for the retransmitted MPDU; and
output the decoded hard-decision MPDU for the retransmitted MPDU when the FCSd for the decoded hard-decision MPDU for the retransmitted MPDU passes; and
discard the data frame when the FCSh for the retransmission header field fails.

19. The non-transitory computer-readable storage medium of claim 18, wherein execution of the instructions further causes the wireless device to process the data frame received from the other wireless device by:
for each retransmitted MPDU of the data frame, storing the soft-decision combined MPDU when the FCSd for the decoded hard-decision MPDU for the retransmitted MPDU fails.

20. The non-transitory computer-readable storage medium of claim 18, wherein execution of the instructions further causes the wireless device to process the data frame received from the other wireless device by:
discarding the soft-decision combined MPDU when the FCSd for the decoded hard-decision MPDU for the retransmitted MPDU passes.

* * * * *